Jan. 24, 1928.  1,657,018
J. LARRABURU
BREAD PROOFING, KNEADING, AND MOLDING MACHINE
Filed Nov. 20, 1923   5 Sheets-Sheet 1
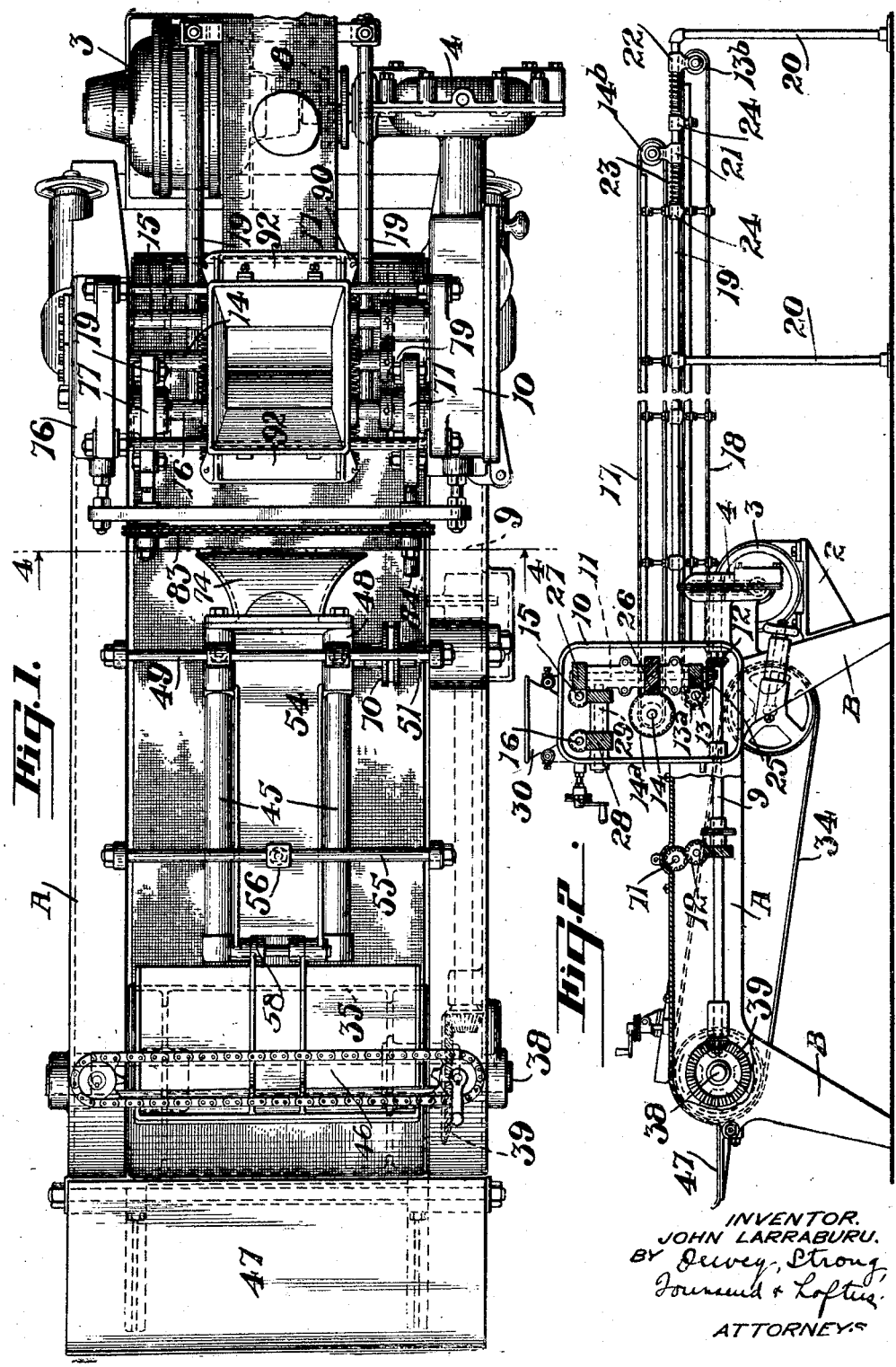
INVENTOR.
JOHN LARRABURU.
BY Dewey, Strong
Townsend & Loftus
ATTORNEYS

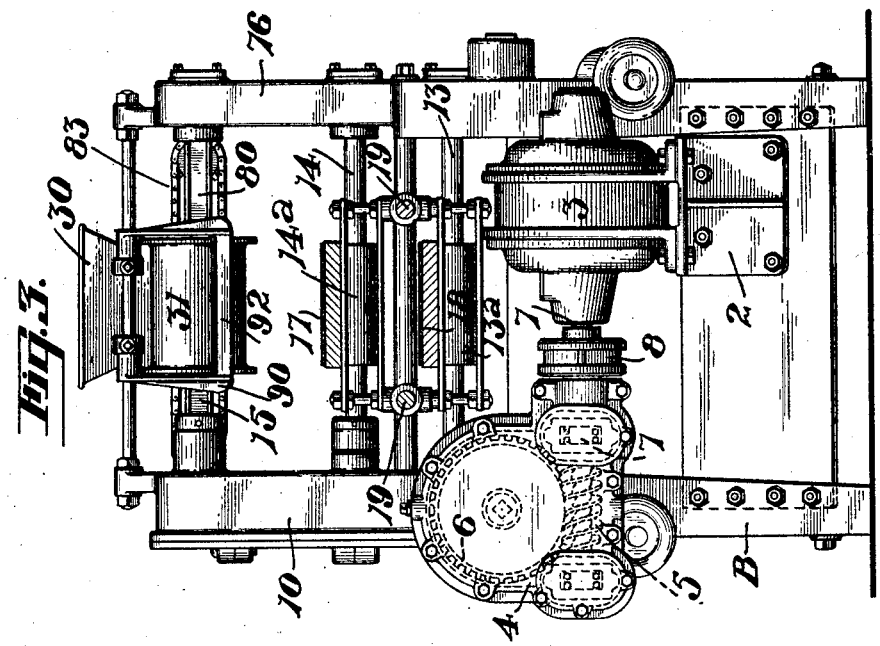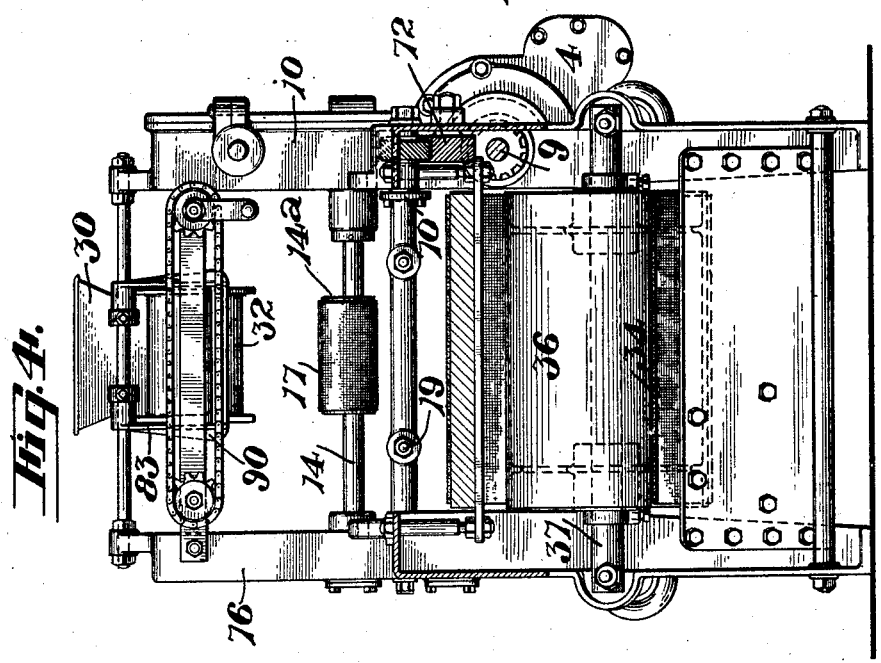

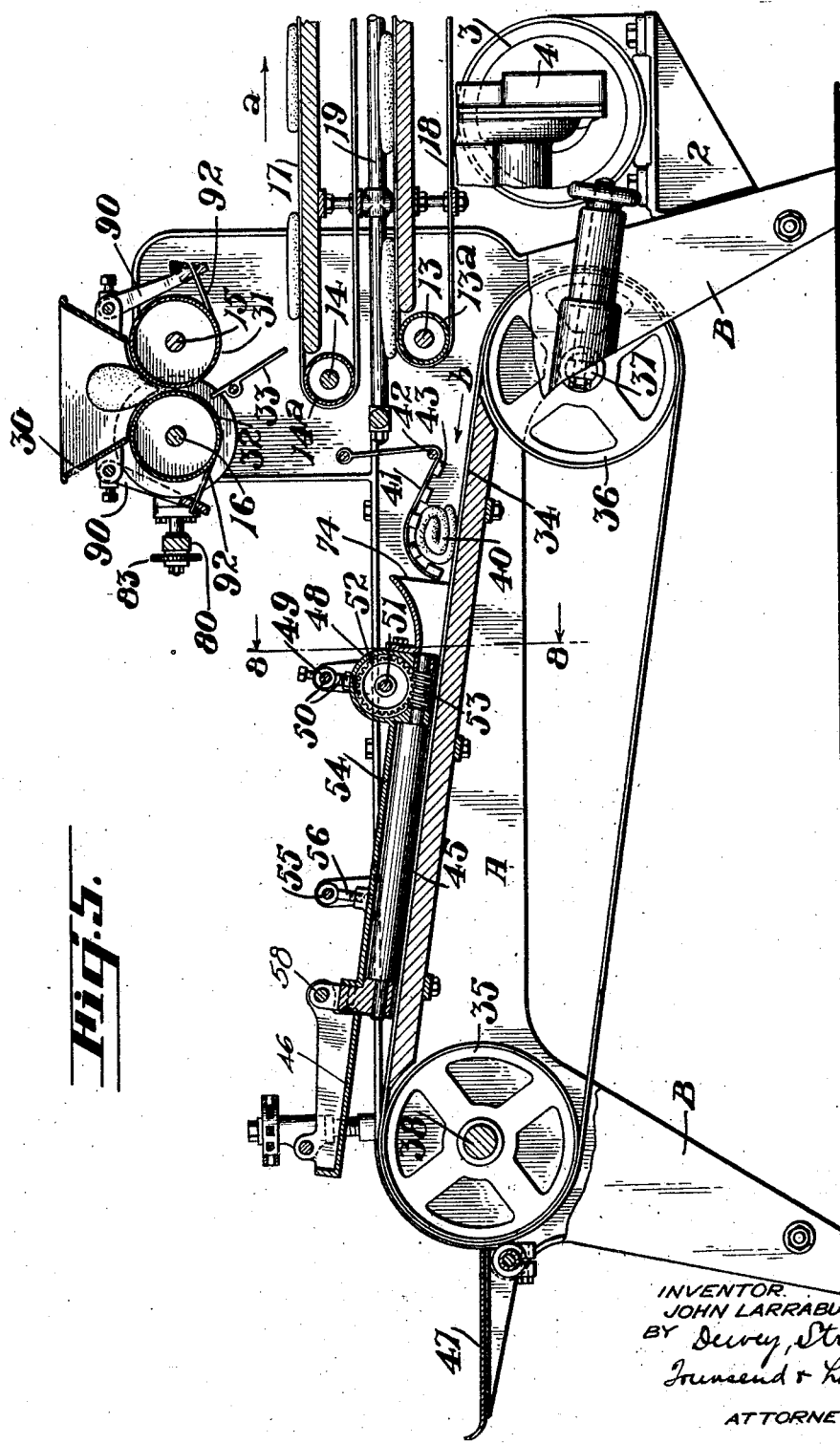

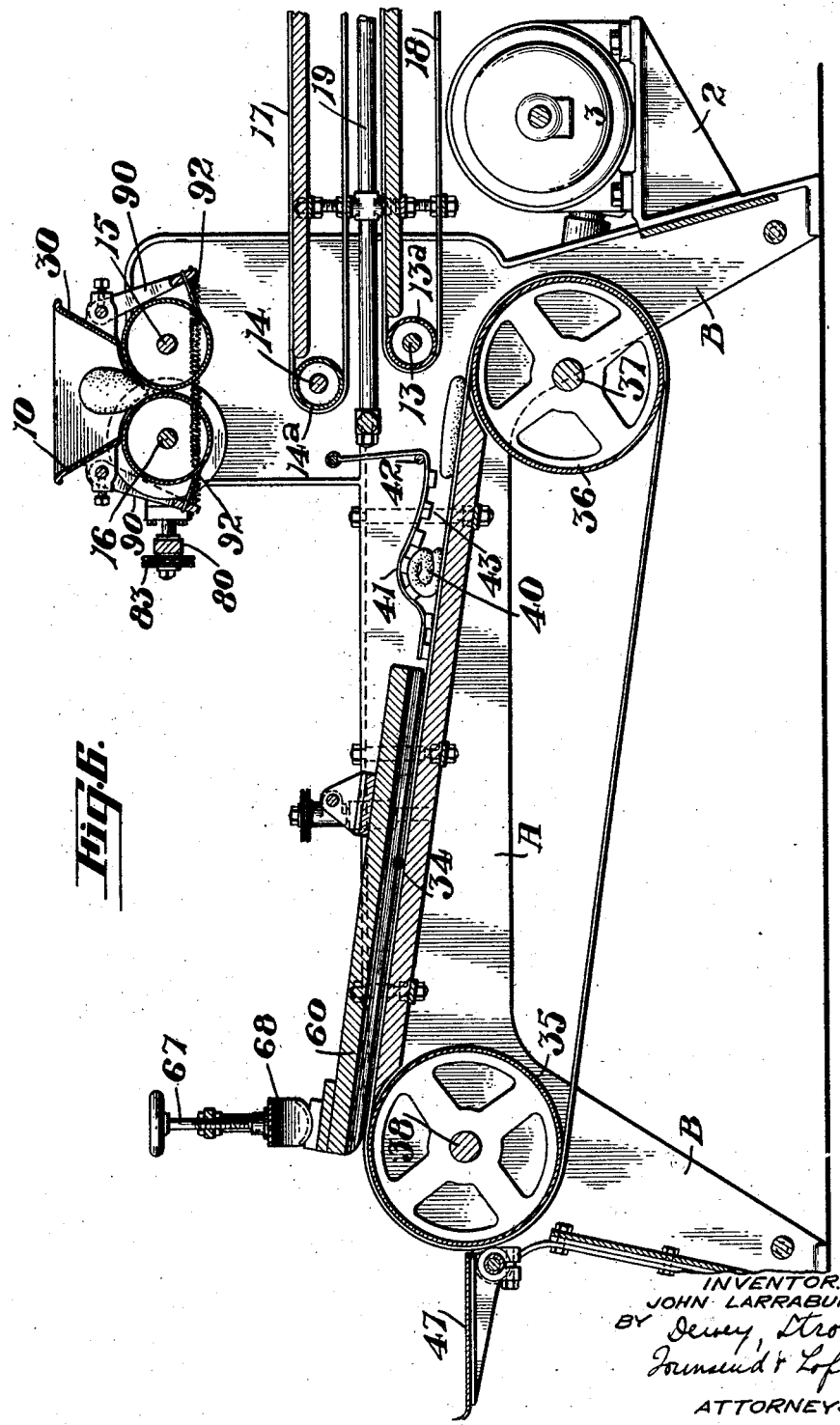

Jan. 24, 1928. 1,657,018
J. LARRABURU
BREAD PROOFING, KNEADING, AND MOLDING MACHINE
Filed Nov. 20, 1923 5 Sheets-Sheet 5
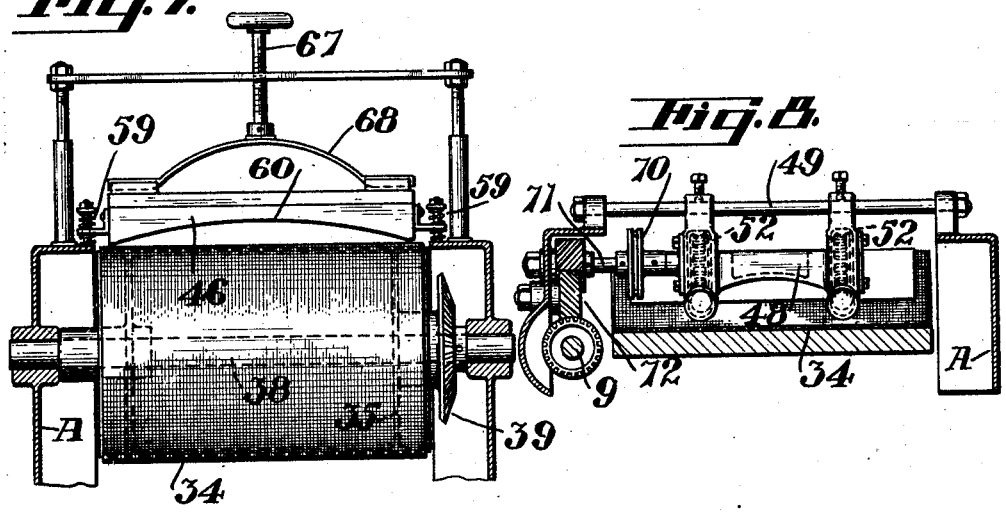
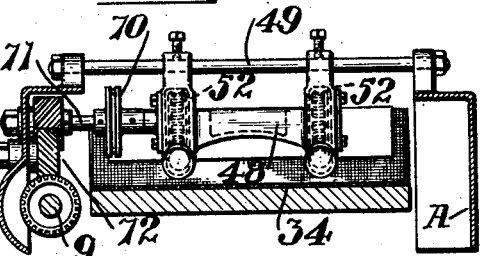
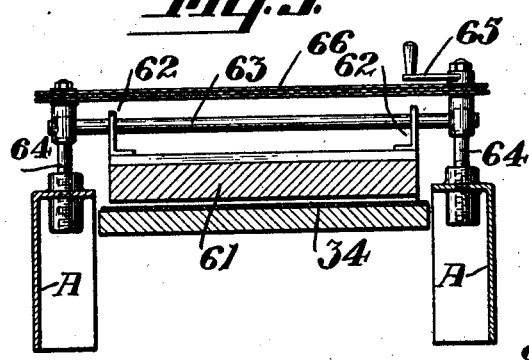
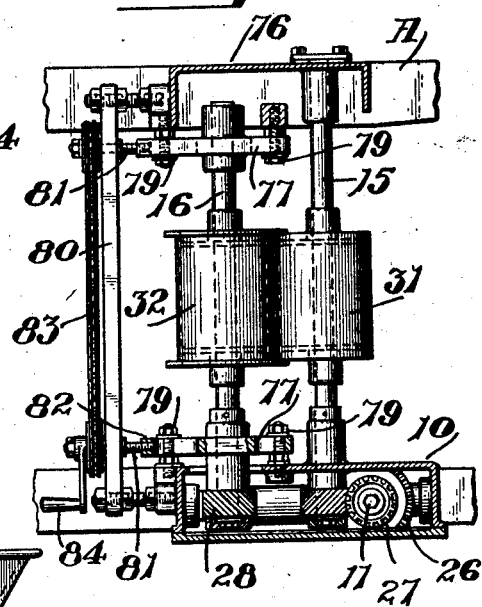
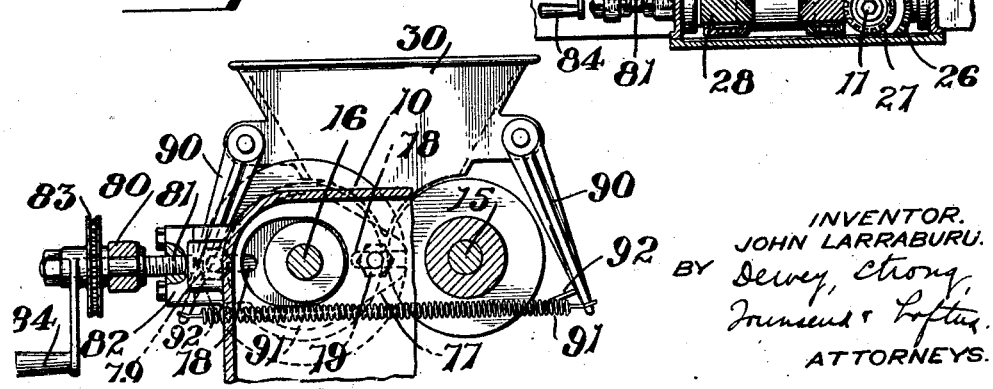
INVENTOR.
JOHN LARRABURU.
BY Dewey, Strong,
Townsend & Loftus.
ATTORNEYS.

Patented Jan. 24, 1928.

1,657,018

UNITED STATES PATENT OFFICE.

JOHN LARRABURU, OF SAN FRANCISCO, CALIFORNIA.

BREAD PROOFING, KNEADING, AND MOLDING MACHINE.

Application filed November 20, 1923. Serial No. 675,842.

This invention relates to a bread proofing, kneading and molding machine.

In the wholesale baking of bread, for instance, in large commercial bakeries and so on, practically all important operations are conducted by means of machinery. For instance, flour, water and other ingredients are mixed in a large machine known as a mixer. The dough produced is then transferred to a machine known as a divider where the dough is cut up or divided into sections proportional to the size of the loaf to be baked. From the divider the dough is transferred to what is known as a rounding machine, the dough being here dusted with flour and rounded. It is then transferred to the proofer where the dough is permitted to raise, the raising of the dough taking place due to the action of the carbon dioxide gas which is liberated by the yeast germs. It is common practice to transfer the dough cakes from the proofer to a molding machine and from the molding machine to racks or pans, which in turn are placed in the oven where the bread is finally baked and completed.

The present invention relates specifically to the operations which take place after the dough leaves the proofer and before it is transferred to the racks or pans for final baking; that is, the invention contemplates a machine which is not only a molding machine but it also serves the function of a secondary proofer and kneading machine, the machine being furthermore designed to handle French bread, French rolls, milk bread, Vienna bread, and pan bread of different makes, and being also designed to mold loaves of various sizes and, obviously, of various shapes. It might here be stated that French loaves have heretofore been molded by hand entirely, this being due to the fact that the molding machines so far employed produce ragged or chewed ends and as a consequence a loaf which is unsightly when completed.

The object of the present invention is to generally improve and simplify machines of this character; to provide a machine which serves the function of a secondary proofer; a kneading machine and a molding machine; a machine which will prevent the formation of chewed or ragged ends, as far as French loaves and like shaped bread are concerned; a machine which will entirely eliminate dusting of the dough cakes before the kneading and molding operations take place; a machine which may be adjusted to take care of various sized loaves and which may be set to produce loaves of various shapes; furthermore, a machine which is entirely automatic in operation and which only requires one operator, to-wit, one who removes the molded dough cakes as they are being discharged.

One form which my invention may assume is exemplified in the following description and illustrated in the accompanying drawings, in which—

Fig. 1 is a plan view of the machine, showing only a portion of the proofing belts.

Fig. 2 is a side elevation of the machine partially in section.

Fig. 3 is an end view of the machine.

Fig. 4 is a transverse section taken on line 4—4, Fig. 1.

Fig. 5 is an enlarged side elevation partially in section, said section also showing the kneading rolls whereby square end loaves, pan bread and the like, are formed.

Fig. 6 is a section similar to Fig. 5, this section, however, showing the molding board whereby French loaves are formed.

Fig. 7 is a detail end view of Fig. 6, showing the position of the molding board whereby French loaves are formed.

Fig. 8 is a detail cross-section on line 8—8, Fig. 5.

Fig. 9 is a detail sectional end view of the molding board shown in Fig. 5.

Fig. 10 is a plan view of the rolls to which the proofed dough cakes are first delivered, said view also illustrating the mechanism whereby one roll is adjusted with relation to the other.

Fig. 11 is a side elevation of Fig. 10 partially in section.

Referring to the drawings in detail, and particularly to Figs. 1 and 2, A indicates a main frame supported by legs or standards such as indicated at B. Suitably supported as on a bracket 2 at one end of the frame is an electric motor 3 and journaled in one side of the frame, in a housing generally indicated at 4, is a reduction gear drive consisting of a worm pinion 5 and a worm gear 6, the pinion 5 being secured on a shaft 7, which is connected with the motor 3 through means of a flexible coupling 8. The gear 6 is secured on a shaft 9 which extends along one side of the main frame. This shaft may be referred to as the drive shaft as all parts of the mechanism hereinafter to be described are driven therefrom. Also secured on one side of the frame and formed integral therewith is a gear case 10 and journaled therein is a vertical shaft 11 which is driven from shaft 9 by means of a pair of bevel gears 12. Extending crosswise of the gear case 10 and the main frame A are a plurality of shafts such as indicated at 13, 14, 15 and 16. Secured on the shafts 13 and 14 are pulleys 13$^a$ and 14$^a$, respectively, and carried thereby are endless conveyor belts such as shown at 17 and 18, the opposite ends of the belts being carried by idler pulleys 13$^b$ and 14$^b$ as shown in Fig. 2. These pulleys are supported by an extension frame 19 carried by standards 20; that is, the pulleys are journaled in bearings 21 and 22 which are slidably mounted on the frame 19 and which are automatically adjusted to maintain a constant tension on the belts 17 and 18 by providing helical springs such as indicated at 23; the springs surrounding the frames 19 and being interposed between the bearings and stationary collars such as shown at 24. The shafts 13 and 14 are driven from shaft 11 through means of spiral gear couples such as indicated at 25 and 26; these gears being disposed within the case 10. The cross-shafts 15 and 16 are also driven from shaft 11 through spiral gear couples such as indicated at 27 and 28, that is, the spiral-gear arrangement shown at 27 transmits power to horizontally disposed shaft 29 and this in turn transmits power to rotate shaft 16 through the spiral gears 28. The shafts 13 and 14, together with shafts 15 and 16, are perhaps best illustrated in Fig. 5. The shafts 15 and 16 are disposed below a receiving hopper 30 and each is provided with a roller such as indicated at 31 and 32, respectively; these rollers being employed for the purpose of kneading or flattening out the dough cakes discharged by a proofing machine of any suitable construction. When the machine is in operation, constant motion is transmitted to the shafts 13, 14, 15, and 16, and consequently to the belts 17 and 18 and to the rollers 31 and 32.

The dough cakes leaving the proofing machine enter the hopper one by one and as the rollers 15 and 16 rotate in the direction of the arrows, it can readily be seen that the rounded cakes will be flattened out and as they leave the rollers 15 and 16 they will strike a deflecting plate 33 which will direct the flattened cakes to the upper run of the belt 17. This belt travels in the direction of arrow $a$ and when pulley 14$^b$ is reached, the cakes are discharged, reversed and delivered to the upper run of the belt 18. This belt travels in the opposite direction and returns the cakes to the pulley 13, which in turn discharges or transfers the cakes to a forming belt generally indicated at 34. It is upon this belt that the kneading of the dough cakes takes place and the final molding operation also takes place upon this belt. The belt 34 is preferably constructed of canvas and it is carried by a pair of pulleys generally indicated at 35 and 36; these pulleys being supported by shafts 37 and 38 journaled in the main frame and extending crosswise thereof; the bearings supporting the shaft 37 being adjustable as shown to permit tightening of the belt cam. The pulley 36 is an idler pulley, while the pulley 35 is the driver, power being transmitted from shaft 9 thereto through a set of bevel gears as indicated at 39.

It was previously stated that the cakes left the rolls 31 and 32 in a flattened condition and that after leaving the same they were transferred first to the belt 17 and, secondly, to the belt 18. The belts 17 and 18 travel fairly slow and the dough cakes are thus submitted to a secondary proofing operation before they are delivered to the forming belt 34. This secondary proofing of the dough cakes is of material importance and embodies one of the features of the present invention. No molding machine, as far as I am aware submits the dough cakes to a secondary proofing action before molding the same, but, conversely, molds the dough cakes the moment they are received from the proofing machine; that is, the dough cakes after leaving the proofing machine are passed between a pair of rollers similar to those indicated at 31 and 32 and flattened thereby, and they are then immediately molded. These machines, however, require a dusting operation or the sprinkling of flour on both sides of the cakes as the cakes would otherwise stick or gum up the molding mechanism. This dusting of the flattened cakes is entirely eliminated in the present instance and superior loaves of bread are obtained as the result thereof.

It has been found that a fairly strong skin is formed on the exterior of the dough cakes during the proofing operation but that this skin is drawn out and saturated with moisture when passed between the rollers 31 and 32 or rollers similar thereto. The saturating of the skin and the drawing out of the same cause the flattened dough cakes to become sticky and it is for this reason that the dusting operation is required in ordinary machines, but it may be eliminated in this instance due to the fact that the flattened dough cakes are not immediately passed to the kneading and molding rolls but they are, conversely, subjected to a secondary proofing operation as they are transferred to the belts 17 and 18 and remain here a sufficient length of time to form a new skin or, in other words, to recuperate, strengthen or form an additional skin which loses its sticky or adhesive quality by the time the cakes reach the forming belt 34. When the cakes reach this belt, which travels in the direction of arrow $b$ (see Fig. 5), they are first rolled upon themselves to form an elongated cake, as indicated at 40; this being accomplished by providing a canvas apron 41 secured at the point indicated at 42. The opposite end of the apron is free and trails loosely on the upper surface of the forming belt, but the under surface of the apron has a series of slats 43 secured thereto. These slats engage the forward edge of each cake as it approaches and it is due to this engaging action of the slats that the respective cakes are rolled upon themselves as shown at 40. It is next necessary to pass the rolled cakes between a pair of kneading rolls such as indicated at 45 (see Figs. 1 and 5). These rolls are spaced fairly close as shown in Fig. 1 and they rotate in the direction of the arrows as shown. This rotation of the kneading rolls 45 causes the ends of the dough cakes to be turned up and folded over, and when the dough cakes in this condition finally leave the kneading rolls 45, they pass under a molding board 46; this board presenting a flat surface to the dough cakes if a squared end or pan loaf is desired, and a convex surface if a French or pointed loaf is desired.

The dough cakes when leaving the molding board 46 pass over the rim of the pulley 35 and they are then received by a table or trough 47 from where they are manually removed and placed in the bread pans, racks or otherwise handled. Again, it is possible that they may be delivered to a conveyor belt and then removed in any manner desired.

The kneading rolls 45 are journalled at one end in a casting 48. This casting is perhaps best illustrated in Figs. 5 and 8. The casting is suspended from a cross rod 49 supported by the main frame, this rod passing through eye-bolts 50, which in turn are adjustably secured to the casting. The casting carries a shaft 51, on each end of which is secured a worm gear 52; these worm gears, respectively, engaging worm pinions 53 secured on the shafts which carry the kneading rolls 45. The casting is extended forwardly between the kneading rolls 45, as indicated at 54, and the forward end is supported by a cross rod 55 supported by the main frame and also by adjustable eye bolts as indicated at 56; the forward ends of the kneading roll shafts being journaled in the forward end of the casting extension as indicated at 57. The molding board 46 is pivotally mounted in the forward end of the casting, as indicated at 58, and the opposite end of the molding board is maintained at a certain elevation with relation to the forming belt by means of springs such as shown at 59 (see Fig. 7). A convex molding board is shown in Fig. 7 as indicated at 60 and this is used when French loaves or the like are being handled, but the molding board presents a flat surface as shown at 61, in Fig. 9, when a squared end loaf or a pan loaf is desired. Fig. 9 also illustrates a modified method of supporting the forward end of the molding board; that is, a pair of lugs 62 is formed on the upper surface of the molding board and these lugs are suspended from a cross rod 63. This rod is in turn carried by a pair of screw standards 64 which, when turned by means of a hand crank 65, raise or lower the forward end of the molding board; the screw rods being turned in unison by a sprocket chain 66 and cooperating sprocket gears secured on the respective rods 64.

In connection with Fig. 7 it is desired to state that the forward end of the molding board is supported by the coil springs 59 but the board may, nevertheless, be raised and lowered with relation to the upper face of the forming belt by means of a screw rod 67. This rod engages a bow-shaped leaf spring 68, which in turn exerts a pressure on the upper surface of the molding board, thus slightly compressing the springs 59 or releasing the same as the case may be.

The kneading rolls indicated at 45 (see Figs. 1, 5 and 8) are, as previously stated, driven from the shaft 51 through means of the worm gear couples indicated at 52 and 53. Shaft 51 is in turn driven through a flexible coupling 70, which in turn is driven from a shaft 71 journaled in the side of the main frame A; the shaft 71 being in turn driven frome shaft 9 through a spiral gear couple such as indicated at 72. The flexible coupling 70 is of considerable importance as it permits slight vertical adjustment of the casting 48 and the shaft 51 or, in other words, it permits the forward or entering ends of the kneading rolls to be slightly raised; the vertical adjustment being obtained by adjusting the position of the eye-bolts 50, said eye-bolts having a threaded connection with relation to the casting 48. The vertical adjustment obtained is very slight but it nevertheless permits dough cakes of various thicknesses to be handled. It is for the same reason that the forward eye-bolt 56 is employed, and it is for the same reason why more or less adjustment is imparted to the forward end of the molding board 46, as illustrated in Figs. 7 and 9; that is, the machine is adjustable to dough cakes of various thicknesses or, in other words, to loaves of various sizes; the shape of the loaves depending entirely upon the under surface of the molding boards as indicated at 60 and 61, in fact these may be slightly convex if desired, for instance, when making Vienna loaves and certain types of square end loaves, The casting 48 also supports a casting such as indicated at 74 (see Figs. 1 and 5). The mouth of this casing is spread and serves as a guide to lead the dough cakes 40 in between the kneading rolls 45. It furthermore serves the function of centering the dough cakes with relation to the kneading rolls, thus producing dough cakes of uniform thickness and shape. The provision of the kneading rolls is also of further importance as by rolling the dough cakes endwise, chewed or ragged ends are entirely prevented.

There is only one other adjustable mechanism which is required; that is, a mechanism which will permit adjustment of the roller 32 with relation to the roller 31. This mechanism is perhaps best illustrated in Figs. 10 and 11. The roller 31, as previously stated, is carried by the shaft 15. This shaft is permanently journaled in the gear case 10 at one end and in an extension of the main frame A at the opposite end. The shaft 16, which supports the roller 32, is horizontally adjustable to and away from the shaft 15 or the roller 31. This is accomplished as follows:

Horizontally movable with relation to the gear case 10 and the extension of the frame A, indicated at 76, is a pair of bearings 77. These bearings carry the shaft 16. The bearings are slotted at each end, as indicated at 78, (see Fig. 11) and supporting bolts 79 extend therethrough. Disposed in front of the gear case 10 and the extension of the main frame shown at 76 is a stationary cross bar 80, and journaled at opposite ends thereof and in alignment with the bearings 77 are screw shafts 81. These shafts have a threaded engagement with the sliding bearing 77, as shown at 82, and, if a turning movement is imparted to the screw shafts, endwise or horizontal movement of the bearings 77 will result. Each screw shaft 81 carries a sprocket gear and these are connected by an endless chain 83; one sprocket gear being provided with a hand crank 84 whereby turning movement is imparted. The screw shafts 81 are thus turned in unison and the bearings 77, together with the shaft 16 and the roller 32, are thus moved in unison either to or away from the roller 31, thus increasing or decreasing the spacing between the rollers and as a consequence the thickness of the dough cakes. This adjustable feature, together with the adjustments which permit a slight vertical movement of the kneading rolls and the molding board 46, is all that is required, as these adjustments will take care of loaves of practically any size desired, the final shape of the loaves being taken care of by the formation of the under surface of the molding board.

Disposed on each side of the hopper 30, adjacent the rollers 31 and 32, are crank arms 90. The lower ends of these arms are connected by coil springs as shown at 91 and they are thereby pulled together. Each set of arms carries a scraper 92 and these scrapers engage the surfaces of the respective rollers 31 and 32 and as such serve the function of continuously removing any adhering flour or dough.

From the foregoing description it can be seen that a bread molding machine has been provided which entirely eliminates the necessity of dusting the dough cakes before they pass through the molding operation. The elimination of this dusting operation is an important feature of the invention as it produces a loaf of bread of superior quality. Actual experience has proven that the addition of raw flour at this period is detrimental. The present machine eliminates this dusting operation as it permits the dough cakes to pass through a secondary proofing action, thereby increasing the strength of the skin and, furthermore, adding new life to the dough.

Kneading of the dough before the molding operation is also an important factor as it further improves the life of the dough to the extent that it more uniformly spreads the carbondioxide gas throughout the dough mixture. The kneading operation is caused by the canvas belt 44 and by the kneading rolls 45, and it also takes place to a certain extent during the final molding operation when the dough passes in under the molding board 45. The kneading rolls 45 also prevent the formation of chewed or ragged ends, thereby materially increasing the appearance of the loaves when baked, and as the machine is adjustable, as previously described, loaves of various sizes may be produced; the shape of the loaves being determined by the contour or formation of the under surface of the molding board.

The machine is entirely automatic in operation, as well as continuous in operation; fifty loaves a minute being readily produced. Operators may be practically eliminated as only one is required; said operator's only duty being that of removing the molded loaves as they are discharged.

While certain features of the present invention are more or less specifically illustrated, I wish it understood that various changes in form and proportion may be resorted to within the scope of the appended claim; similarly, that the materials and finish of the several parts employed may be such as the experience and judgment of the manufacturer may dictate or various uses may demand.

Having thus described my invention, what I claim and desire to secure by Letters Patent is—

In a machine of the character described, a receiving hopper, a pair of flattening rolls disposed below the same, a pair of superposed conveyors disposed below the flattening rolls and adapted to receive flattened dough cakes discharged by the rolls, the uppermost conveyor discharging the cakes to the lowermost conveyor, a drive shaft, a vertically disposed shaft, means for transferring power from the drive shaft to said vertical shaft, means for transferring power from the vertical shaft to drive the conveyors in unison, a horizontally disposed shaft, means for transferring power from the vertical shaft to the horizontal shaft, and means for transferring power from the horizontal shaft to drive the flattening rolls in unison.

JOHN LARRABURU.